United States Patent [19]

Ishikura et al.

[11] Patent Number: 4,802,543

[45] Date of Patent: Feb. 7, 1989

[54] ELECTRIC POWER STEERING DEVICE

[75] Inventors: Hisatsugu Ishikura; Shigeki Saito, both of Katsuta, Japan

[73] Assignees: Hitachi, Ltd.; Hitachi Automotive Eng. Co., both of Tokyo, Japan

[21] Appl. No.: 41,225

[22] Filed: Apr. 22, 1987

[30] Foreign Application Priority Data

Apr. 22, 1986 [JP] Japan .................................. 61-91249

[51] Int. Cl.$^4$ .............................................. B62D 5/04
[52] U.S. Cl. .................... 180/79.1; 180/142
[58] Field of Search ................. 180/79.1, 142

[56] References Cited

U.S. PATENT DOCUMENTS

| | | | |
|---|---|---|---|
| 3,983,953 | 10/1976 | Bayle | 180/79.1 |
| 4,577,716 | 3/1986 | Norton | 180/79.1 |
| 4,629,024 | 12/1986 | Buike et al. | 180/79.1 |
| 4,685,528 | 8/1987 | Suzuki et al. | 180/79.1 |

FOREIGN PATENT DOCUMENTS

| | | |
|---|---|---|
| 0190678 | 8/1986 | European Pat. Off. |
| 1395954 | 5/1975 | United Kingdom . |
| 2136370 | 9/1984 | United Kingdom . |
| 2145988 | 4/1985 | United Kingdom . |
| 2170157 | 7/1986 | United Kingdom . |
| 2170763 | 8/1986 | United Kingdom . |

Primary Examiner—David M. Mitchell
Assistant Examiner—Donn McGiehan
Attorney, Agent, or Firm—Antonelli, Terry & Wands

[57] ABSTRACT

An electric power steering device for generating and controlling auxiliary steering force using a motor, having, a detector for detecting operation force transmitted from a steering wheel to a steering mechanism of a vehicle, and a controller for controlling current supplied to the motor depending on the detected operation force, wherein the electric current is maintained zero when the detected operation force is smaller than a predetermined value and a proportional relationship is maintained between the detected operation force and the electric current when said detected operation force is greater than the predetermined value.

2 Claims, 3 Drawing Sheets

ELECTRIC POWER STEERING DEVICE

BACKGROUND OF THE INVENTION

The present invention relates to a power steering device which employs an electric actuator to generate an auxiliary steering force, and particularly relates to an electric power steering device that is adapted to passenger cars.

The power steering devices of the hydraulic type have heretofore been chiefly employed in the automobiles. In recent years, however, power steering devices of the electric type have been proposed in many types owing to a large variety of control functions and easiness for fitting to the vehicles. A representative example can be seen, for example, in Japanese Patent Laid-Open No. 70257/1984.

According to the conventional electric power steering device as disclosed in the above-mentioned Japanese patent publication, a so-called bias control is carried out. That is, when the operation force applied to a steering wheel reaches a predetermined value, the auxiliary steering force is increased in a stepwise manner in order to suppress the change in the auxiliary steering force when the steering wheel is being manipulated.

The electric actuator, such as an electric motor used for the electric power steering device, generates a force anytime an electric current flows thereto even when the magnitude of the electric current is so small that it will not produce an output. The electric actuator does not start the motion when the electric current supplied thereto is to small that the operation force produced is still smaller than the static friction force thereof. The operation force, however, is being produced. With the above-mentioned electric power steering device relying upon the conventional bias control, the static friction force suddenly changes in the steering system due to the rise of the electric current when the steering wheel is manipulated with a small force, producing an abnormal steering feeling for the driver.

SUMMARY OF THE INVENTION

The object of the present invention is to provide an electric power steering device which copes with problems inherent in the above-mentioned prior art, and which offers sufficiently smooth steering feeling even in very small manipulation regions such as when the steering wheel is just started to be turned.

According to the present invention, the above-mentioned problem is solved by changing a relationship between the operation force and the electric current supplied to the electric actuator depending upon the magnitude of the operation force applied to the steering wheel, by setting the electric current to be zero when the operation force lies within a very small range, and by changing the electric current in proportion to the operation force when the operation force exceeds the very small range.

Even when the steering wheel is manipulated with a very small force, the electric current flowing to the electric actuator does not change in a stepwise manner, but changes proportionally. Therefore, the static friction force does not quickly change, and smooth steering feeling is obtained.

DETAILED DESCRIPTION OF PREFERRED EMBODIMENT

The electric power steering device of the present invention will now be described in detail in conjunction with the diagrammed embodiment.

Figure 1:
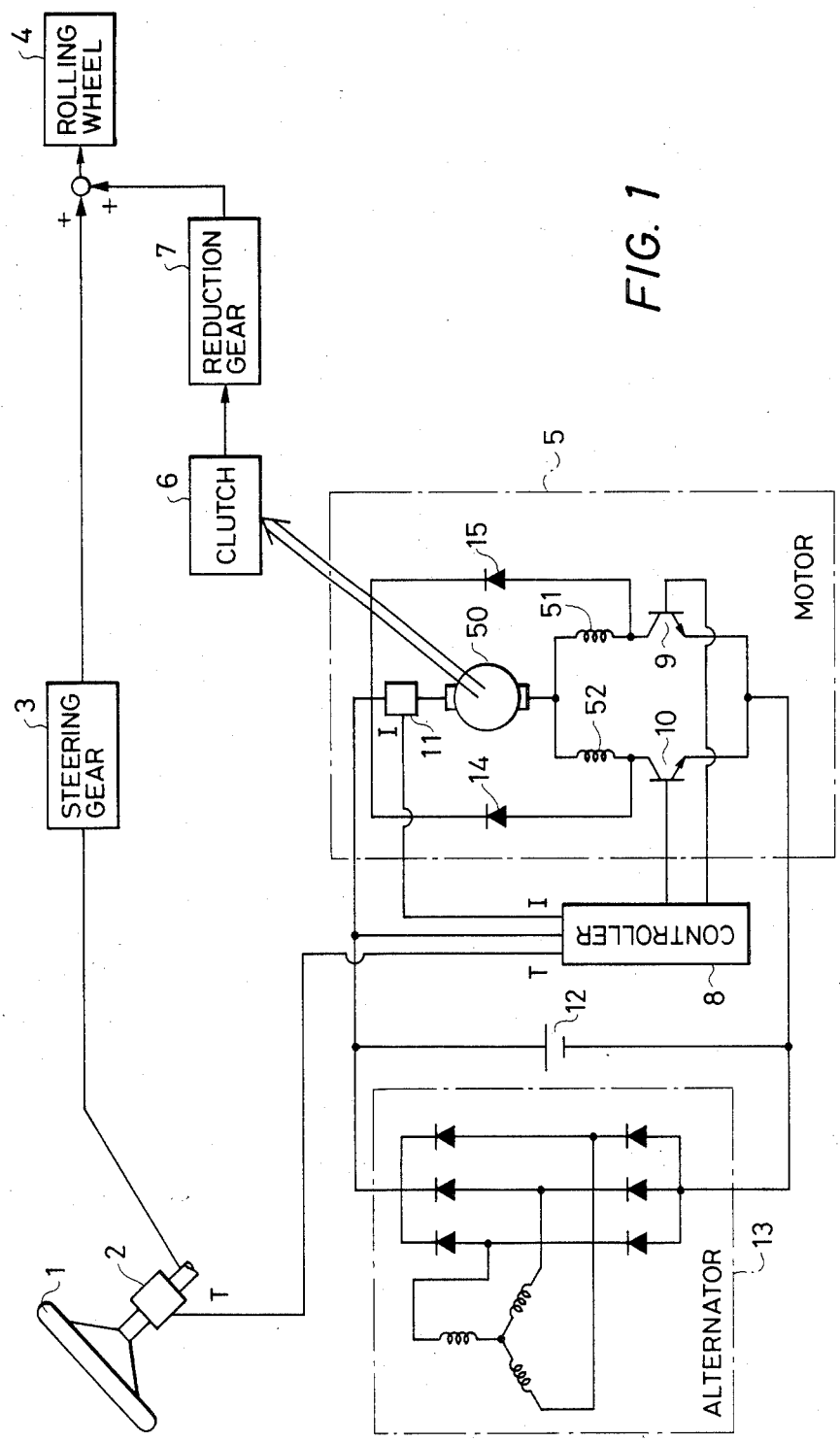
FIG. 1 is a block diagram of an electric power steering device according to an embodiment of the present invention.

FIG. 1 illustrates an embodiment of the present invention which employs a d-c motor as an electric actuator and which detects, upon a torque sensor, an operation force applied to the steering wheel. In FIG. 1, reference numeral 1 denotes a steering wheel (hereinafter simply referred to as wheel), 2 denotes a torque sensor mounted on the rotary shaft of the wheel 1, reference numeral 3 denotes a steering gear (steering mechanism), 4 denotes a rolling wheel (steered wheel), 5 denotes a d-c motor which generates auxiliary steering force, 6 denotes a fail-safe clutch, 7 denotes a reduction gear, 8 denotes a controller (control circuit), reference numerals 9 and 10 denote switching transistors, 11 denotes a current detector which detects the electric current that flows into the d-c motor 5, reference numeral 12 denotes a battery, 13 denotes an alternator, 14 and 15 denote diodes for free wheel, 50 denotes an armature of the d-c motor 5, and reference numerals 51 and 52 denote field coils.

During the ordinary steering operation, the operation torque applied to the wheel 1 is detected by the torque sensor 2, and an electronic signal is received by the controller 8. Depending upon the signal produced by the torque sensor 2, the controller 8 supplies a pulse output signal having a different duty ratio to the transistor 9 or 10, and chopper-controls the motor 5 which then transmits the torque to the rolling wheel 4 via clutch 6 and reduction gear 7 in order to assist the steering force of the wheel 1.

The motor 50 is a d-c series-wound motor which has a field winding 51 for clockwise revolution and a field winding 52 for counterclockwise revolution. The power source is a battery 12 mounted on a car and which is electrically changed by the alternator 13.

A steering angle is given to the rolling wheel 4 owing to the steering force which consists of the combination of operation force transmitted from the wheel 1 via the steering gear 3 and the auxiliary steering force transmitted from the motor 5 via the reduction gear 7. Therefore, the motor 5 produces the auxiliary steering torque depending upon the torque detected by the torque sensor 2, and whereby the power steering function is obtained.

Figure 2:
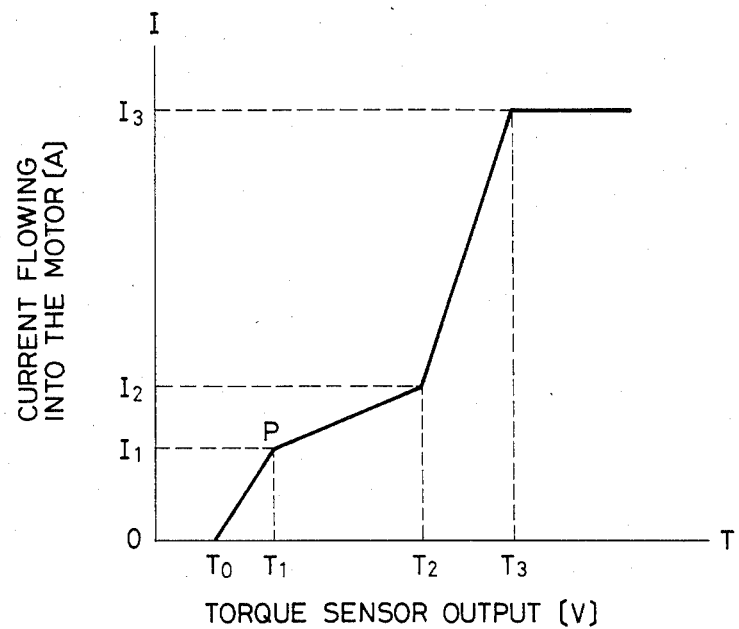
FIG. 2 is a diagram showing the control characteristics.

FIG. 2 illustrates a relationship between the armature current I of the motor 50 and the output voltage T (which represents an operational torque given to the wheel 1) produced by the torque sensor 2, and modified by the controller 8. That is, the controller 8 has a control function to select different modes of relationship between the output voltage T and the current I detected by the current detector 11, depending upon the output voltage T of the torque sensor 2. Namely, the controller 8 operates so that the current I is maintained zero in a region where the output voltage T is smaller than a voltage $T_0$, i.e., in a region where the steering torque given to the steering wheel 1 is smaller than a predetermined value, and so that the current I increases in proportion to the increase of voltage T starting from zero current in a region where the output voltage T is greater than the voltage $T_0$ but is not greater than a voltage $T_3$, the proportional constant being different over a region of from the voltage $T_0$ to a voltage $T_1$, over a region of from the voltage $T_1$ to a voltage $T_2$, and over a region of from the voltage $T_2$ to the voltage $T_3$.

According to this embodiment, therefore, smooth steering feeling is obtained just when the steering wheel is started to be moved, and the driver will not feel uncomfortable. The reasons will be described below.

Figure 3:
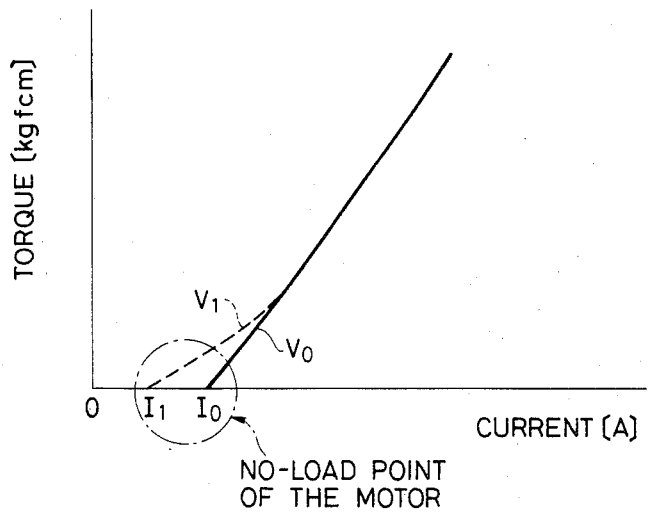
FIG. 3 and 4 are diagrams showing characteristics of an electric motor.

FIG. 3 shows current vs. torque characteristics of the motor 5, wherein a solid line represents characteristics of when the armature terminal voltage is $V_0$ which is, for example, 12 volts, and a broken line represents characteristics of when the armature terminal voltage is $V_1$ which is, for example, 2 volts. The rotational loss of the motor 5 decreases with the decrease in the terminal voltage. Therefore, the no-load current of the motor 5 also decreases from $I_0$ [A] to $I_1$ [A]. When the steering wheel 1 is manipulated by a small amount, therefore, the controller 8 reduces the voltage applied to the motor owing to chopper control. Therefore, the motor produces the output starting with the current $I_1$ [A].

The control must be performed smoothly at a point where the motor starts to produce output, i.e., at an assist starting point, so that the driver will not feel uncomfortable.

Figure 4:
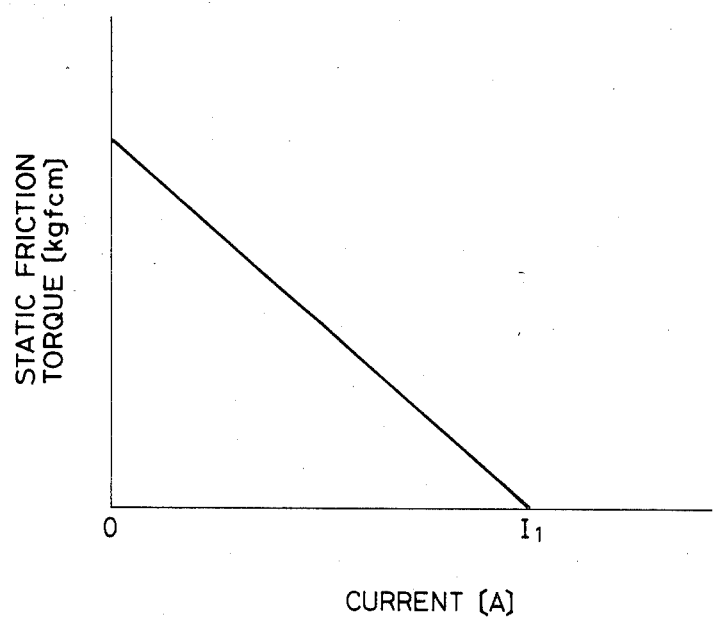

The motor 5 produces the torque but does not start to turn so long as its torque is smaller than or equal to the static friction torque thereof. FIG. 4 shows the static friction torque in a low current region which is smaller than the rotation start current of the motor 5, i.e., which is smaller than the noload current. In this section, the motor produces zero output. However, the static friction torque decreases in proportion to the current. When the motor 5 is turned from the external side, therefore, the force required for turning the motor varies. In the electric power steering device which employs a reduction gear, in particular, the force required for turning the motor changes between O [A] and $I_1$ [A] to a degree that is not negligible.

In controlling the assist force of the motor 5, i.e., in controlling the electric current, therefore, if the current is increased up to the no-load current $I_1$ [A] as in the conventional art, the response is improved but the force required for turning the steering wheel changes suddenly, presenting abnormal steering feeling. However, to effect the control up to the region where the motor is producing no output, is wastefull and is meaningless.

Because of the above-mentioned reasons according to this embodiment, there are established torque sensor output vs. armature current characteristics as shown in FIG. 2. That is, the current that flows into the motor 5 is raised at a steep inclination from 0 [A] to the no-load current $I_1$ [A] for the output voltage T of the torque sensor 2. Then, the current is increased at a mild inclination from a point at which the motor 5 starts to produce the output to initiate the assist operation to a point $I_2$ [A] where the torque is relatively small yet, in order to maintain smoothness in the steering operation. At this moment, the point $I_2$ [A] where the torque is relatively small yet, in order to maintain smoothness in the steering operation. At this moment, the point $I_2$ [A] is determined based upon the feeling in practically driving the car. Then, as the force required for operating the wheel increases resulting in an increase in the torque sensor output voltage in excess of $T_2$ [V], the current is increased again at a steep inclination up to a current limit value $I_3$ [A]. The inclination form 0 [A] to the point P in FIG. 2, should be arbitrarily determined depending upon the characteristics of the motor and the test results obtained really using cars.

According to this embodiment as described above, inclination is imparted to the torque sensor output vs. current characteristics even in a low current region where the current is smaller than a rotation starting point of the motor 5, the inclination is lowered once the motor has started to produce the output, and the inclination is increased again as the force for operating the steering wheel has increased. Therefore, the steering feeling is sufficiently improved without impairing response characteristics, and developing an uncomfortable feeling.

According to the present invention as described above, the control operation for the electric actuator that generates auxiliary steering force is already started even under the condition where the electric current is still smaller than a point at which the electric actuator starts to produce the operation force. Therefore, the invention sufficiently copes with the problems inherent in the conventional art, and markedly improves the steering feeling at the time when the driver has just started to turn the steering wheel.

What is claimed is:

1. In an electric power steering device operatively positioned between a steering wheel and a steering mechanism of a vehicle:

torque sensing means for detecting torque applied to the steering wheel for producing an electrical signal related to the amount of said torque;

an electrically powered actuator means for generating rotational assist torque to provide an auxiliary steering force to the vehicle steering mechanism;

control means responsive to the electrical signal supplied by the torque sensing means for producing an electric current to drive said actuator means in a direction corresponding to the direction of movement of the steering wheel to thereby generate a rotational assist torque;

said control means being effective to maintain said drive electric current zero when the applied torque is smaller than a predetermined value that is less than when static friction is overcome and rotational assist torque occurs;

said control means further being effective to provide a constant proportional relationship between said electric current and said applied torque when said applied torque exceeds said predetermined value until the applied torque causes initiation of rotational assist torque from said actuator means; and wherein a second proportional relationship between said electric current and said applied torque is provided after rotational assist torque is initiated, said second proportional relationship being less than said constant proportional relationship.

2. In an electric power steering device operatively positioned between a steering wheel and a steering mechanism of a vehicle;

torque sensing means for detecting torque applied to the steering wheel for producing an electrical signal related to the amount of said torque;

an electrically powered actuator means for generating rotational assist torque to provide an auxiliary steering force to the vehicle steering mechanism;

control means responsive to the electrical signal supplied by said torque sensing means for producing an electric current to drive said actuator means in a direction corresponding to the direction of movement of the steering wheel to thereby generate a rotational assist torque;

said control means being effective to maintain said drive electric current zero when the applied torque is smaller than a predetermined value that is less than when static friction is overcome and rotational assist torque occurs;

said control means further being effective to provide a constant proportional relationship between said electric current and said applied torque when said applied torque exceeds said predetermined value until the applied torque causes initiation of rotational assist torque from said actuator means; and wherein the constant proportional relationship between the operation force and the electric current in the range of the operation force just before rotational assist torque is generated until rotational assist torque is applied by the actuator means is greater than a second porportional relationship which occurs starting at a point where said rotational assist torque by the actuator is applied to the steering mechanism.

* * * * *